(12) United States Patent
Butler et al.

(10) Patent No.: US 6,643,788 B1
(45) Date of Patent: Nov. 4, 2003

(54) METHOD FOR DETECTING A NUMBER OF CONSECUTIVE VALID DATA FRAMES AND ADVANCING INTO A LOCK MODE TO MONITOR SYNCHRONIZATION PATTERNS WITHIN A SYNCHRONIZATION WINDOW

(75) Inventors: John Mitchell Butler, Garland, TX (US); Terry Neal McDonald, Cedar Hill, TX (US); Tom Matthew Maggio, Dallas, TX (US); John Allen Armstrong, Rowlett, TX (US); Brian Willard Leikam, Littleton, CO (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/450,864

(22) Filed: Nov. 29, 1999

Related U.S. Application Data

(60) Provisional application No. 60/110,304, filed on Nov. 30, 1998.

(51) Int. Cl.[7] .............................. H04L 7/00; H04J 3/06; G06F 11/00
(52) U.S. Cl. ..................... 713/400; 770/509; 714/707
(58) Field of Search ..................... 713/400; 370/509; 714/707, 784, 756

(56) References Cited

U.S. PATENT DOCUMENTS

| | | | | |
|---|---|---|---|---|
| 4,751,648 A | * | 6/1988 | Sears et al. | 340/3.21 |
| 5,259,004 A | * | 11/1993 | Nakayama | 370/509 |
| 5,623,497 A | * | 4/1997 | Shimawaki et al. | 714/704 |
| 6,081,570 A | * | 6/2000 | Ghuman et al. | 375/368 |
| 6,161,203 A | * | 12/2000 | Zuranski et al. | 714/707 |

FOREIGN PATENT DOCUMENTS

JP    62171324 A  *  7/1987  .......... H03M/13/00

OTHER PUBLICATIONS

Kay et al, Macintosh Based Space Telemetry Data Acquisition System, 1992 IEEE, pp. 12–23–12–27.*

* cited by examiner

Primary Examiner—Thomas Lee
Assistant Examiner—Suresh K Suryawanski
(74) Attorney, Agent, or Firm—Baker Botts L.L.P.

(57) ABSTRACT

One data stream is input to a radio frequency (RF) input terminal of a first receiver interface circuit, and the second bit stream is applied to an RF input terminal of a second receiver interface circuit. Each of the receiver interface circuits includes a Reed-Solomon frame synchronization, forward error correction and derandomizer module receiving the bit stream pattern from the RF terminal of the ground station. Following processing in the derandomizer module, the bit stream is input to a wide band frame synchronization module for synchronization on byte-aligned synchronization pattern at the beginning of each wide-band communications block frame. When synchronization has been established, the data frames are collected for transfer to a memory buffer module. Data buffered in the memory buffer module is direct memory access transferred by a VERSA Module Eurocard (VME) bus interface module to the satellite ground station.

13 Claims, 12 Drawing Sheets

METHOD FOR DETECTING A NUMBER OF CONSECUTIVE VALID DATA FRAMES AND ADVANCING INTO A LOCK MODE TO MONITOR SYNCHRONIZATION PATTERNS WITHIN A SYNCHRONIZATION WINDOW

RELATED APPLICATIONS

This application claims the benefit of U.S. Provisional Application Serial No. 60/110,304, filed Nov. 30, 1998.

TECHNICAL FIELD OF THE INVENTION

This invention relates to a receiver interface circuit and more particularly to a receiver interface circuit accepting serial wideband data from an RF terminal and converting the data into a format compatible with down stream computer processing.

BACKGROUND OF THE INVENTION

In the mid-80's the challenge was to develop telemetry systems and technology to meet increasingly sophisticated processing requirements of bit stream data in a commercial remote sensing system. Today, commercial remote sensing system operators foresee an increasing number of commercial, both operational and planned, satellite missions requiring processing of high data rates representing a significantly large volume of image information. With the increasing number of satellites, the problem of rapidly and accurately ingesting data from multiple or concurrent satellite passes increases exponentially. Heretofore, data received from commercial remote sensing systems was stored on high density digital tapes. The data from these tapes was transcribed offline from this old and increasing expensive media.

At the present time, computers and digital technology have advanced to a point where it is possible to directly capture down link data onto a computer bus and subsequently onto tape. Framed data can then be transferred to computer readable tape offline.

Thus, there is developed a requirement for real time processing of bit stream data in a commercial remote sensing system from the antenna receiver to the analyzing computer.

SUMMARY OF THE INVENTION

In accordance with the present invention, there is provided a receiver interface circuit incorporated into a communication and image processing network of a commercial remote sensing system (CRSS). The function of the receiver interface circuit is to accept serial wideband data from an RF terminal of an antenna system at a high data rate and convert the data into a format compatible with computer processing. The receiver interface circuit is part of an RF subsystem within the CRSS ground system and receives down link data from a satellite. In a typical application, the down link data is transmitted to the ground station as a single X-band carrier having quadrature phase shift keying modulation. The receiver interface circuit accepts the X-band signal from the antenna system, demodulates the signal, and outputs two serial data signals.

A receiver interface circuit in accordance with the present invention accepts one of two serial data signals and a clock signal from an RF receiver and converts this data for acceptance by a processing computer. The receiver interface circuit buffers the input data in memory for transferring directly into the memory of the processing computer.

In accordance with the present invention, a signal receiver interface circuit includes a frame synchronization module that receives an input data bit stream and analyzes the bit stream for synchronization bit patterns to identify frame synchronization. Following frame synchronization identification, the input data bit stream transfers to a wideband frame synchronization module to identify bit stream synchronization. Following frame synchronization and bit stream synchronization, the input data bit stream is stored in a memory buffer module for processing to a downstream computer. To transfer the stored input data bit stream to the downstream computer, a bus interface couples to the memory buffer module for transferring the stored data bit stream for processing and analysis.

BRIEF DESCRIPTION OF THE DRAWINGS

FIG. 9 is a block diagram of the Reed-Solomon synchronization detection, validation and byte alignment submodule of FIG. 6 illustrating signals and data passing between various submodule components;

DETAILED DESCRIPTION OF THE DRAWINGS

Figure 1:
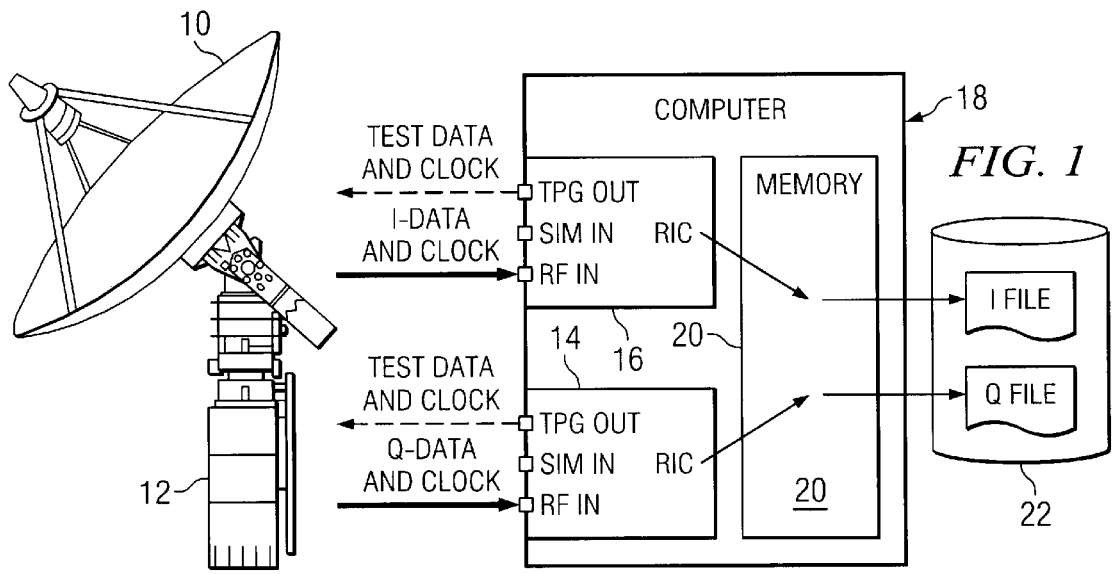
FIG. 1 is a schematic illustration of a commercial remote sensing system with the receiver interface circuit of the present invention coupled to receive data from a satellite receiver for transferring to memory of a processing computer, for example a Silicon Graphics computer.

Referring to FIG. 1, there is illustrated an antenna 10 of a commercial receiver satellite system as part of a satellite ground station 12 that includes a RF terminal. The RF terminal outputs ECL wideband data on two(I and Q) serial data streams. One data stream is input to an RF input terminal of a receiver interface circuit 14 and the second bit stream is applied to an RF input terminal of a receiver interface circuit 16. Each of the receiver interface circuits is illustrated as a circuit card of a Silicon Graphics computer 18 including memory 20. Following processing by the computer 18, the data bit stream is stored in a tape drive system 22.

Figure 2:
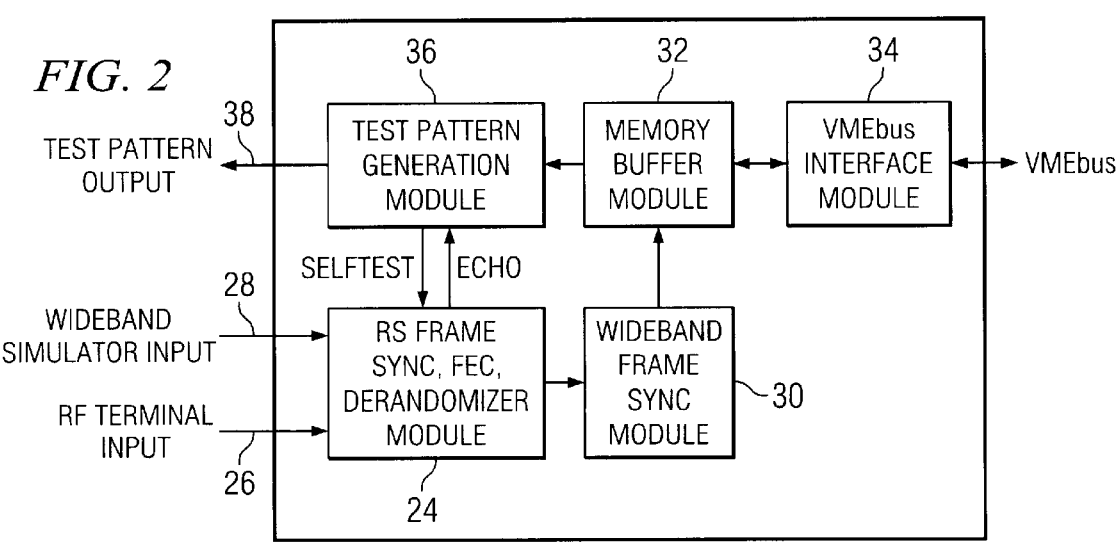
FIG. 2 is a block diagram of the receiver interface circuit of FIG. 1 illustrating the modules for analyzing synchronization of it stream for storage and transfer to a processing computer.

Referring to FIG. 2, there is shown a block diagram of each of the receiver interface circuits 14 and 16. Each receiver interface circuit includes a Reed-Solomon frame synchronization, forward error correction and derandomizer module 24 receiving a bit stream pattern from the RF terminal of the ground station 12 on an input line 26. Also input to the module 24 for receiver testing is a wideband simulator input on a line 28.

Following processing in the module 24, the bit stream is input to a wideband frame synchronization module 30 for synchronization on byte aligned synchronization patterns at the beginning of each wideband communications block frame (WCB FRAME). Where synchronization has been established, the WCB FRAMES are collected for transfer to a memory buffer module 32. Data buffered in the module 32 is direct memory access transferred by means of a VME bus interface module 34 to the SGI memory 20 of FIG. 1.

Also included in the receiver interface circuit is a test pattern generation module 36 providing a test pattern output on a line 38 for a self test of the receiver interface circuit.

Figure 3:
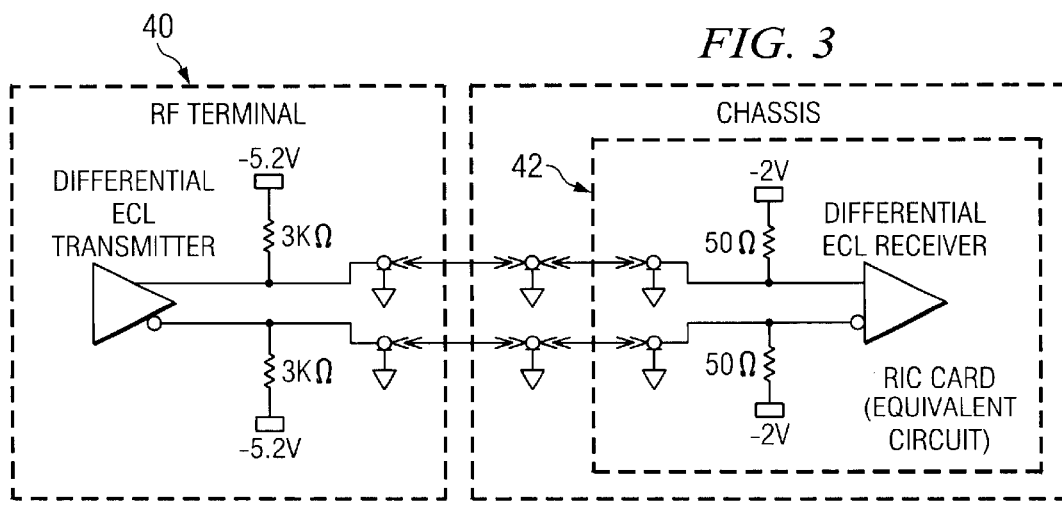
FIG. 3 is a schematic diagram of the RF terminal interface between the satellite receiver of FIG. 1 and an equivalent circuit of the receiver interface circuit of the present invention.

Referring to FIG. 3, there is shown an equivalent circuit diagram of the interconnection between the RF terminal 40 of the ground station 12 interconnected to an equivalent circuit 42 of a receiver interface circuit. The differential ECL transmitter of the equivalent RF terminal 40 outputs one of two serial data signals and a clock signal for input to the differential ECL receiver of the equivalent circuit 42.

Figure 4:
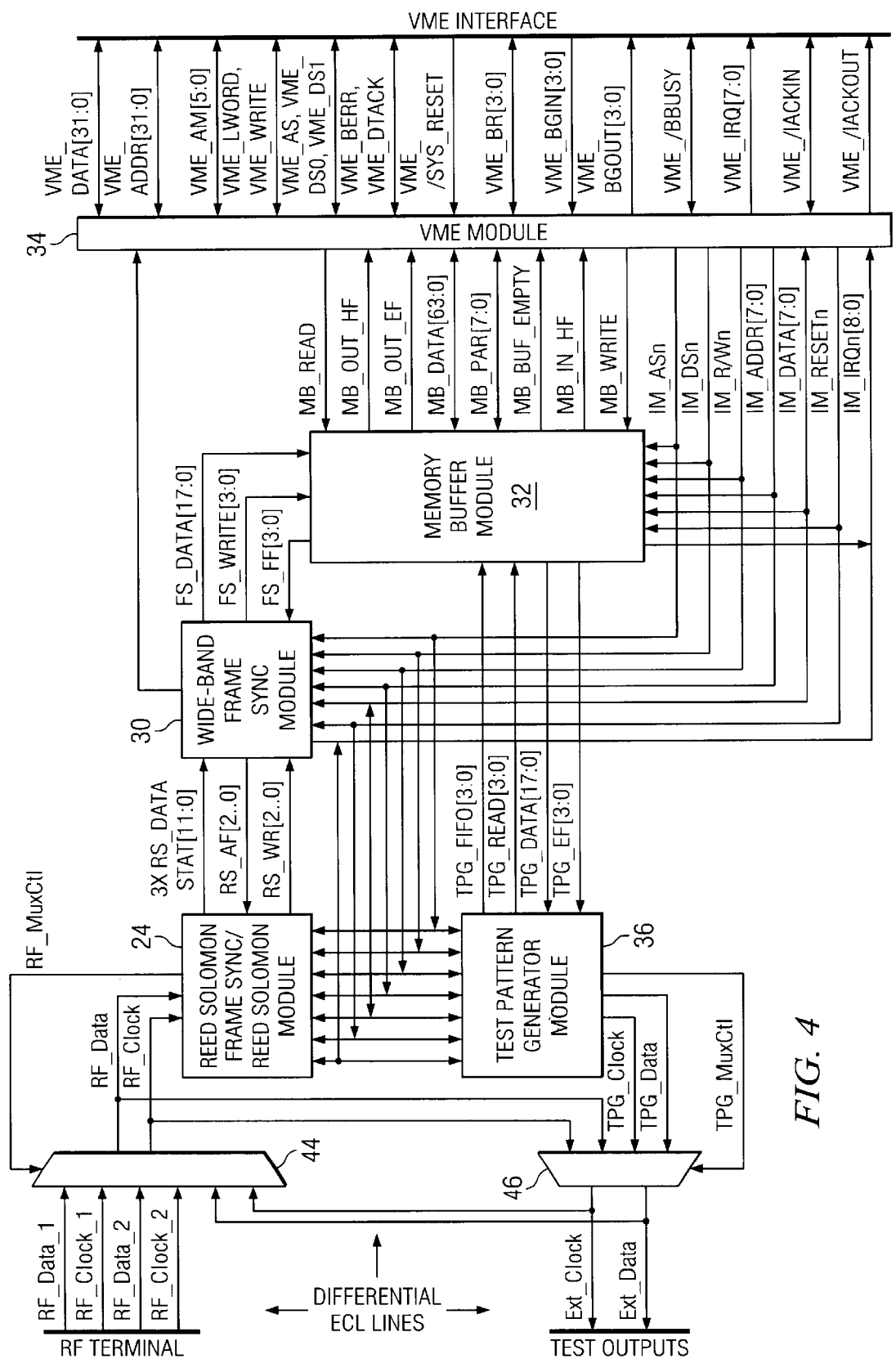
FIG. 4 is the next level block diagram of the receiver interface circuit of FIG. 2 illustrating module interconnection and data paths.

Referring to FIG. 4, there is shown an expanded block diagram of the receiver interface circuit of FIG. 2 including the Reed-Solomon frame synchronization, forward error correction and derandomizer module 24 receiving RF data and an RF clock from a multiplexer 44. Reed-Solomon data is transferred from the module 24 to the wideband frame synchronization module 30. Frame synchronization data is transferred to the memory buffer module 32 and a frame synchronization completion command is input to the VME module 34. Test pattern data is transferred between the various module from the test pattern generator module 36 that also outputs a TPG clock and TPG data to a multiplexer 46.

Figure 5:
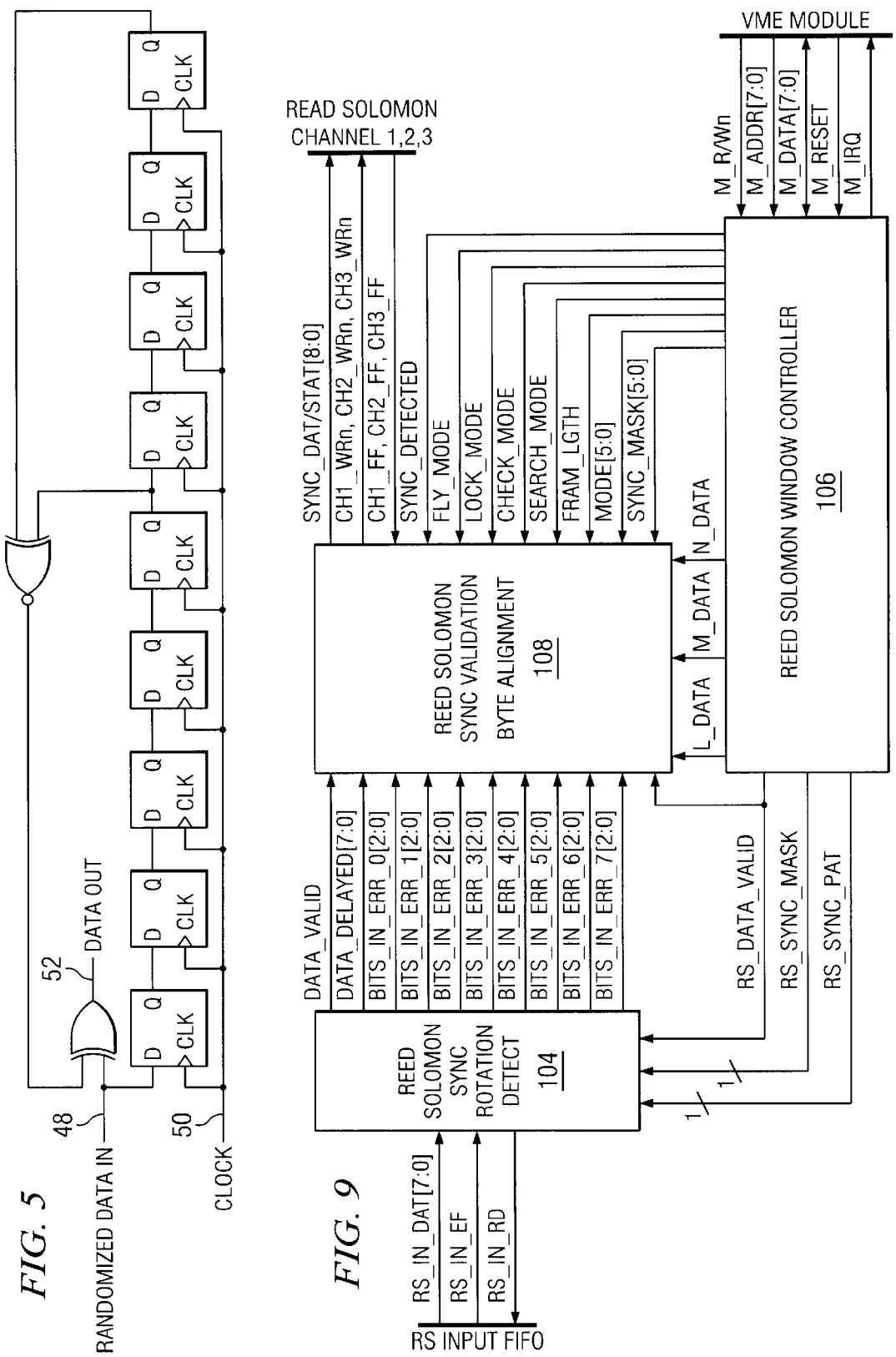
FIG. 5 is a logic diagram of a derandomizer of the frames synchronization FEC and derandomizer module of FIG. 2.

Referring to FIG. 5, the data received by the receiver interface circuit from the satellite ground station 12 is transferred at two levels of framing and randomized. As the receiver interface circuit receives the serial data stream from the terminal equipment, the initial function is to derandomize the data utilizing the logic of FIG. 5. The logic diagram receives the randomized data on a line 48 and a clock on a line 50 and outputs derandomized data on a line 52.

Figure 6:
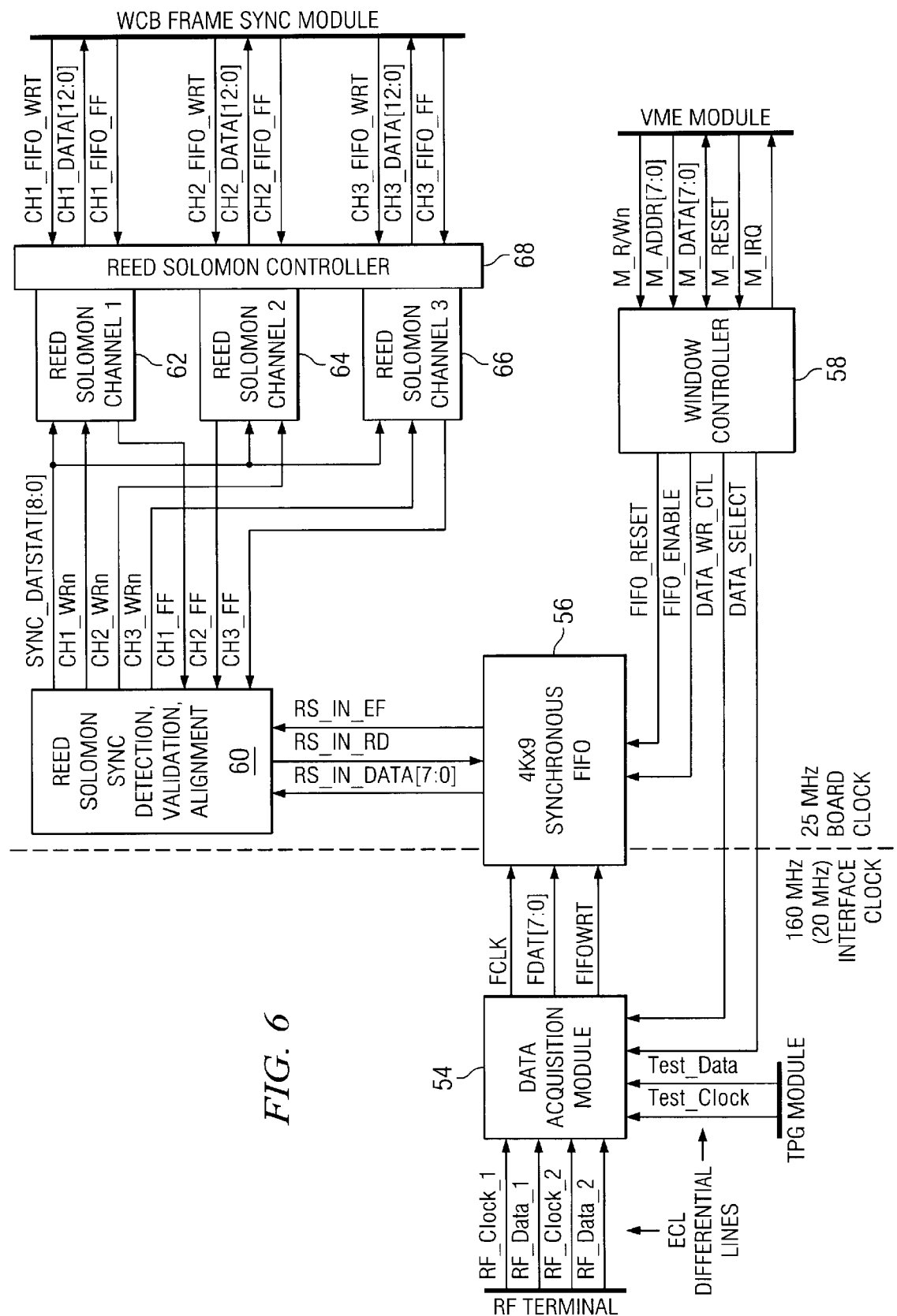
FIG. 6 is a block diagram of a Reed-Solomon synchronization detection, validation and alignment submodule of the frame synchronization, FEC and the derandomizer module of FIG. 2.

Referring to FIG. 6, there is shown an expanded block diagram of the module 24 including a data acquisition module 54 receiving data from the RF terminal and also data from the TPG module 36. Data from the data acquisition module 54 is transferred to a synchronous first in first out (FIFO) module 56 that also receives reset and enable signals from a window controller 58. The data bit stream passed through the synchronous FIFO module 56 is input to a Reed-Solomon synchronization detection, validation and alignment module 60. Three channels of data from the module 60 are applied through respective channel circuits 62, 64 and 66 to a Reed-Solomon controller 68 and output to the wideband frame module 30.

Figure 7:
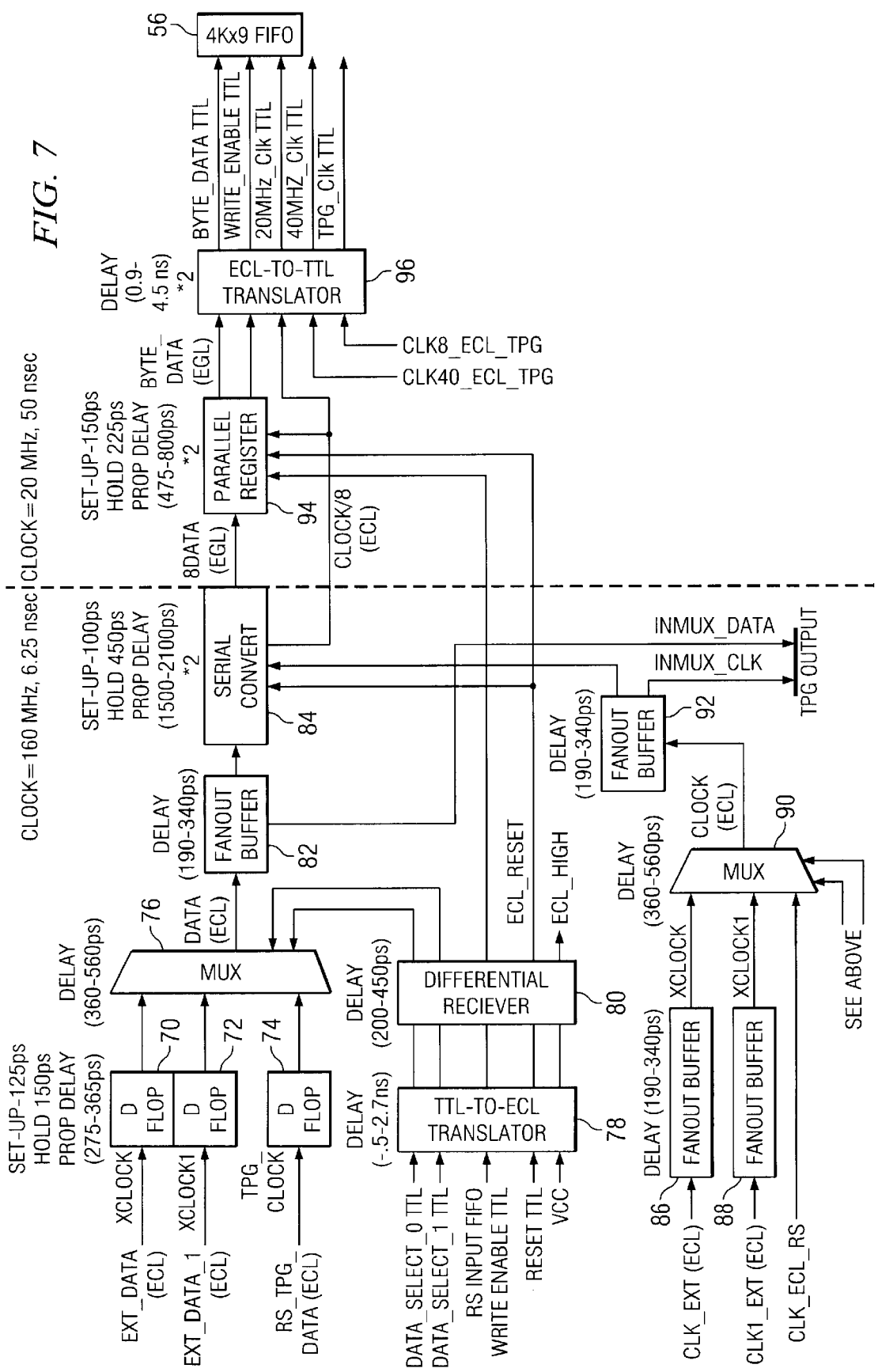
FIG. 7 is a block diagram of the data acquisition module of FIG. 6.

Referring to FIG. 7, there is shown an expanded block diagram of the data acquisition module 54 of FIG. 6. Data is input to the data acquisition module at a D flop 70 and a D flop 72. Test data is input to the module 54 through a D flop 74. The output of each of the D flops 70, 72 and 74 is input to a multiplexer 76 that also receives signals from a differential receiver 80. The receiver 80 receives control signals from a TTL-TO-ECL translator 78.

Output data from the multiplexer 76 is applied to an input of a fan out buffer 82 having one output applied to the test pattern generator and a second output applied to a serial converter 84. Also input to the serial converter 84 is an ECL reset from the differential receiver 80. Data output from the serial converter 84 is applied to a parallel register 94 also receiving two inputs from the differential receiver 80.

Also input to the serial converter 84 are clock signals from a fan out buffer 92. Clock signals received by the data acquisition module 54 are applied to a fan out buffer 86 and a fan out buffer 88. Clock outputs from the fan out buffers 86 and 88 are applied to a multiplexer 90 that outputs a clock signal to the fan out buffer 92.

In addition to a data output, the serial converter 84 outputs a clock signal applied to the parallel register 94 and an ECL-TO-TTL translator 96. Also input to the ECL-TO-TTL translator 96 is the output of the parallel register 94. Byte data, a write enable signal and a clock signal, are output from the translator 96 and applied to the synchronous FIFO module 56.

Figure 8A:
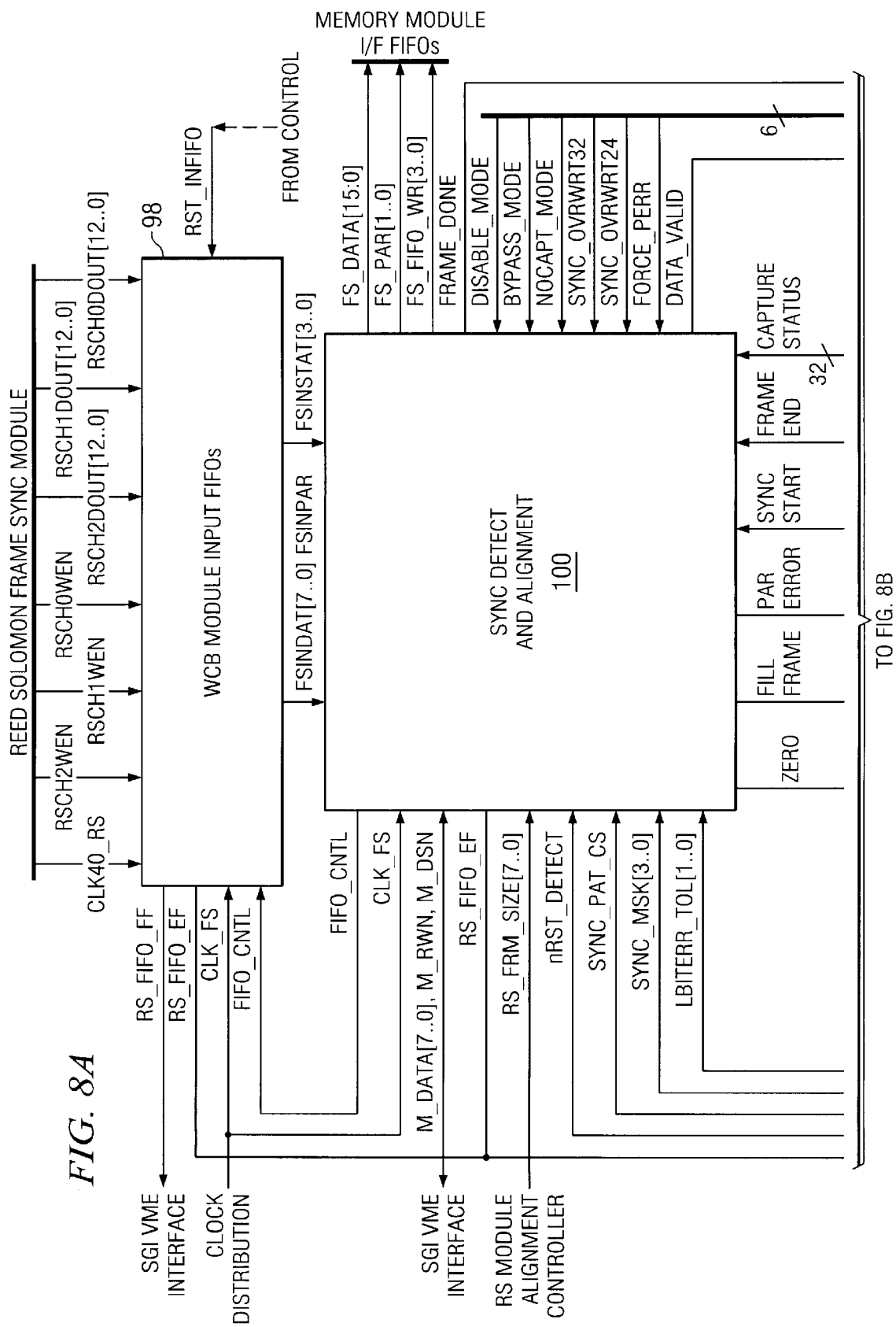
FIG. 8 is a block diagram of the wideband frame synchronization module of FIG. 2.
Figure 8B:
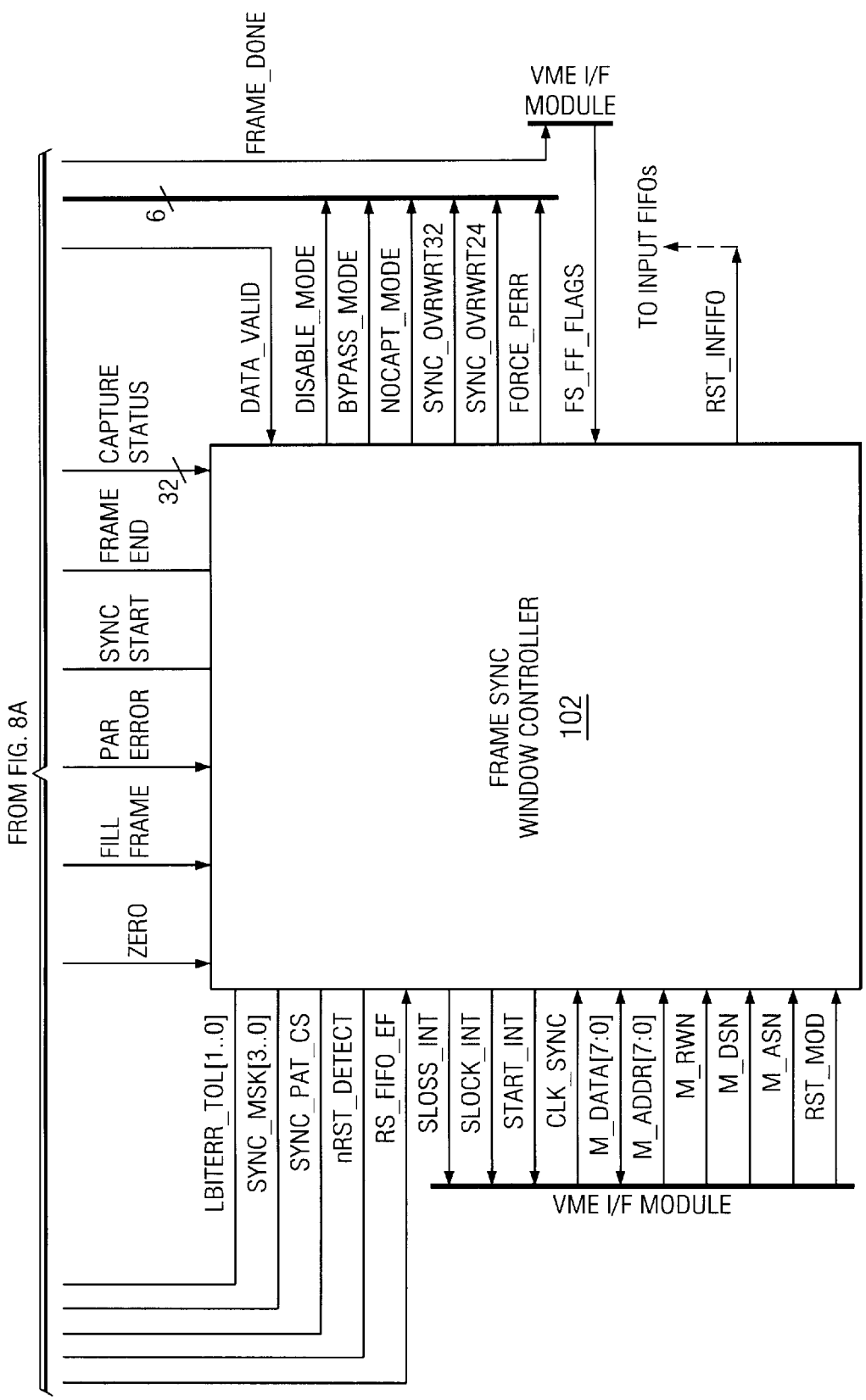

Referring to FIG. 8, there is shown an expanded block diagram of the wideband frame synchronization module 30 for synchronization on a byte aligned synchronization pattern at the beginning of each wideband communications block frame (WCB FRAME). The wideband frame synchronization module 30 includes a WCB module input 98 that receives bit stream data and clock signals from the Reed-Solomon frame synchronization, forward error correction, and derandomizer module 24. In addition, the module input 98 receives clock signals and control signals. Outputs from the module input 98 are applied to a synchronization detection and alignment module 100 also having connections to a frame synchronization window controller 102. Output data from the synchronization detection and alignment module 100 is applied to the memory module 32. Control signals from the synchronization detection and alignment module 100 are also applied to the VME interface module 34.

Referring to FIG. 9, there is shown an expanded block diagram of the Reed-Solomon synchronization detection, validation and alignment module 60 of FIG. 6. Reed-Solomon input data from the synchronous FIFO module 56 is applied to a Reed-Solomon synchronization rotation detector 104. Also applied to the rotation detector 104 are control signals from a Reed-Solomon window controller 106. Additional outputs from the window controller 106 are signals applied to a Reed-Solomon synchronization validation and byte alignment module 108. The byte alignment module 108 also receives data bits from the Reed-Solomon synchronization rotation detector 104. As illustrated in FIG. 6, an output from the Reed-Solomon synchronization validation and byte alignment module 108 is three channels of data applied to the Reed-Solomon controller 68 of FIG. 6.

Figure 10:
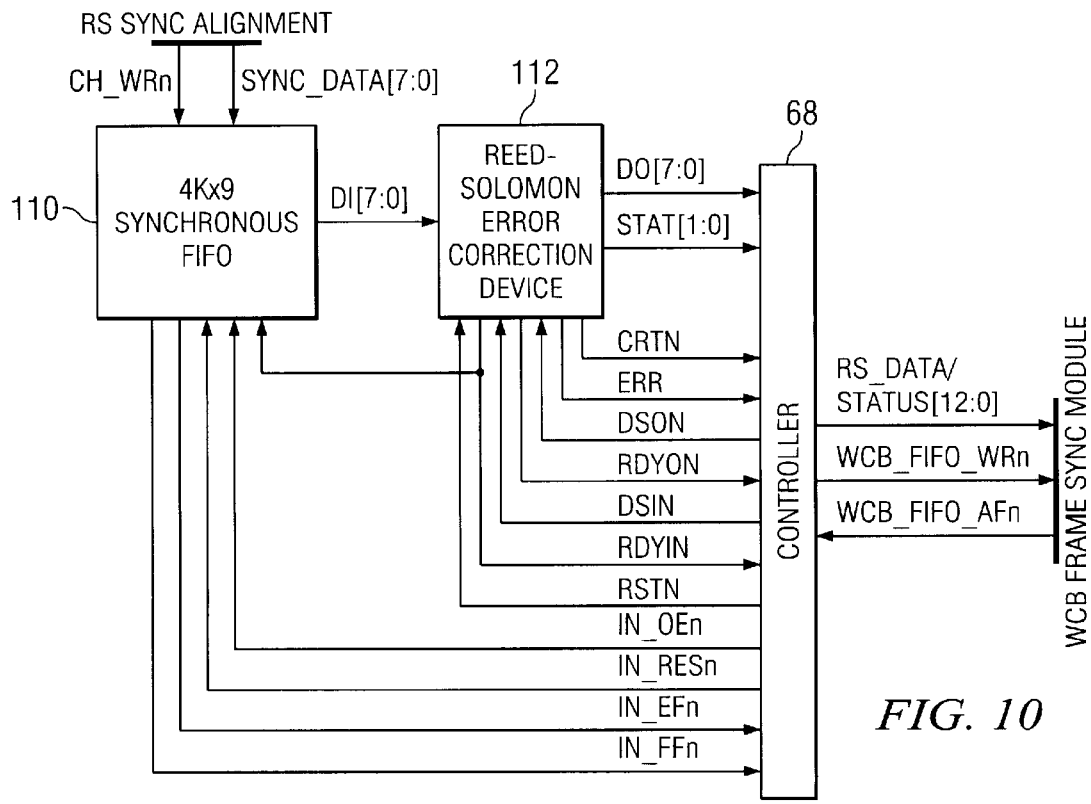
FIG. 10 is a Reed-Solomon channel block diagram of the frame synchronization and derandomizer module of FIG. 2.

Referring to FIG. 10, there is shown a block diagram of the Reed-Solomon channel modules 62, 64, and 66. Reed- Solomon synchronization alignment data from the module 60 of FIG. 6 is input to a synchronous FIFO module 110. An output of the synchronous FIFO module 110 is applied to a Reed-Solomon error correction device 112. An output of the error correction device 112 is applied to input terminals of the controller 68. As illustrated in FIG. 10, the controller 68 receives signals from the FIFO module 110 and the error correction device 112 and provides control signals to these elements. As previously explained, an output of the controller 68 is applied to the wideband frame synchronization module 30 of FIG. 2.

Figure 11:
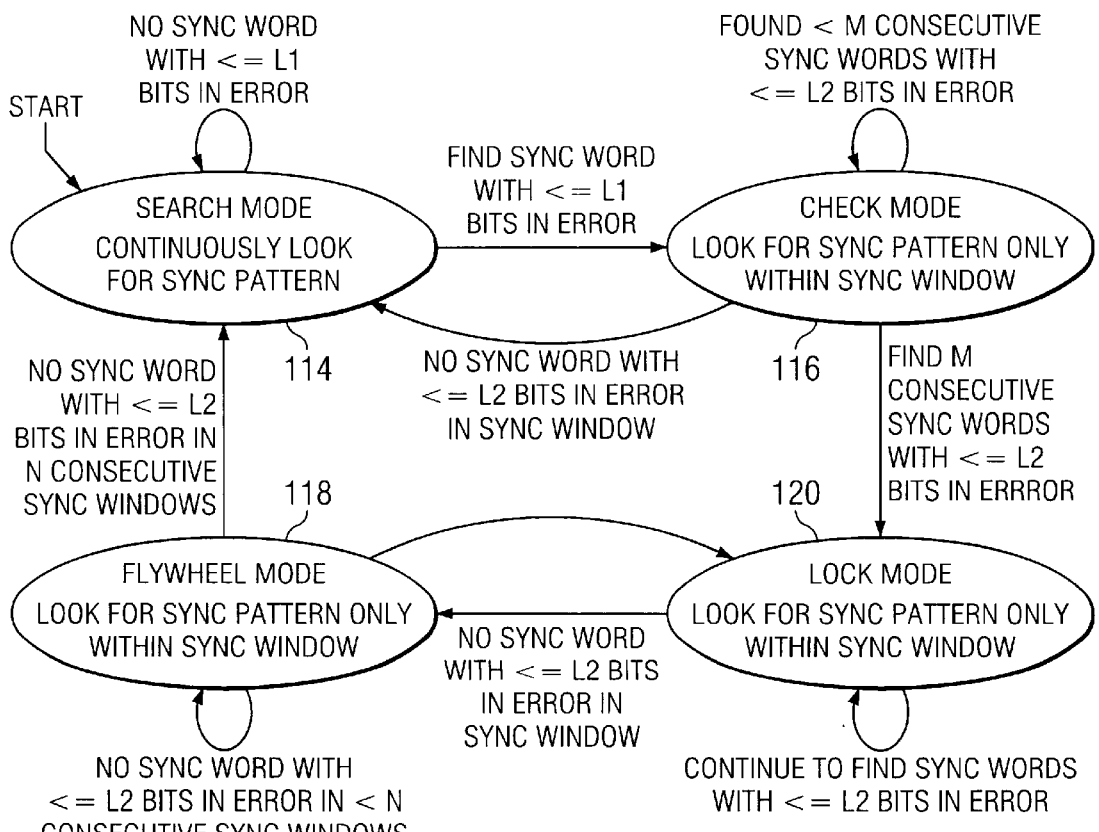
FIG. 11 is a state diagram illustrating Reed-Solomon frame synchronization in accordance with the present invention.

Referring to FIG. 11, there is shown a state diagram for Reed-Solomon frame synchronization in accordance with the present invention. Frame synchronization starts at the search mode 114 and continuously looks for a synchronization pattern. Synchronization is established when a predetermined number of consecutive data frames having valid formats are detected. A validated frame format is defined as follows: (a) frame length correct within +/- Kbits where a frame length is defined as the separation (in number of bits) from the start of one synchronization signal to the start of the next synchronization signal, (b) the synchronization signal matches with no more than a preset number of bit errors. After synchronization has been established, the sequence advances to a check mode 116 to monitor for a synchronization pattern only within a synchronization window. An out of synchronization condition is declared when a predetermined number of consecutive data blocks with invalid formats are detected. When the predetermined number of consecutive data frames with valid formats are detected, the sequence advances to the lock mode 120 to monitor for synchronization patterns only within the synchronization window. When those synchronization words are identified with the predetermined number of bits or less in error in the synchronization window, then the sequence advances to the fly wheel mode 118 to again monitor for synchronization patterns falling within a synchronization window. The sequence continues to cycle through the search mode 114, the check mode 116, the lock mode 120 and the fly wheel mode 118 to identify synchronization lock for consecutive data frames with valid formats.

Figure 12:
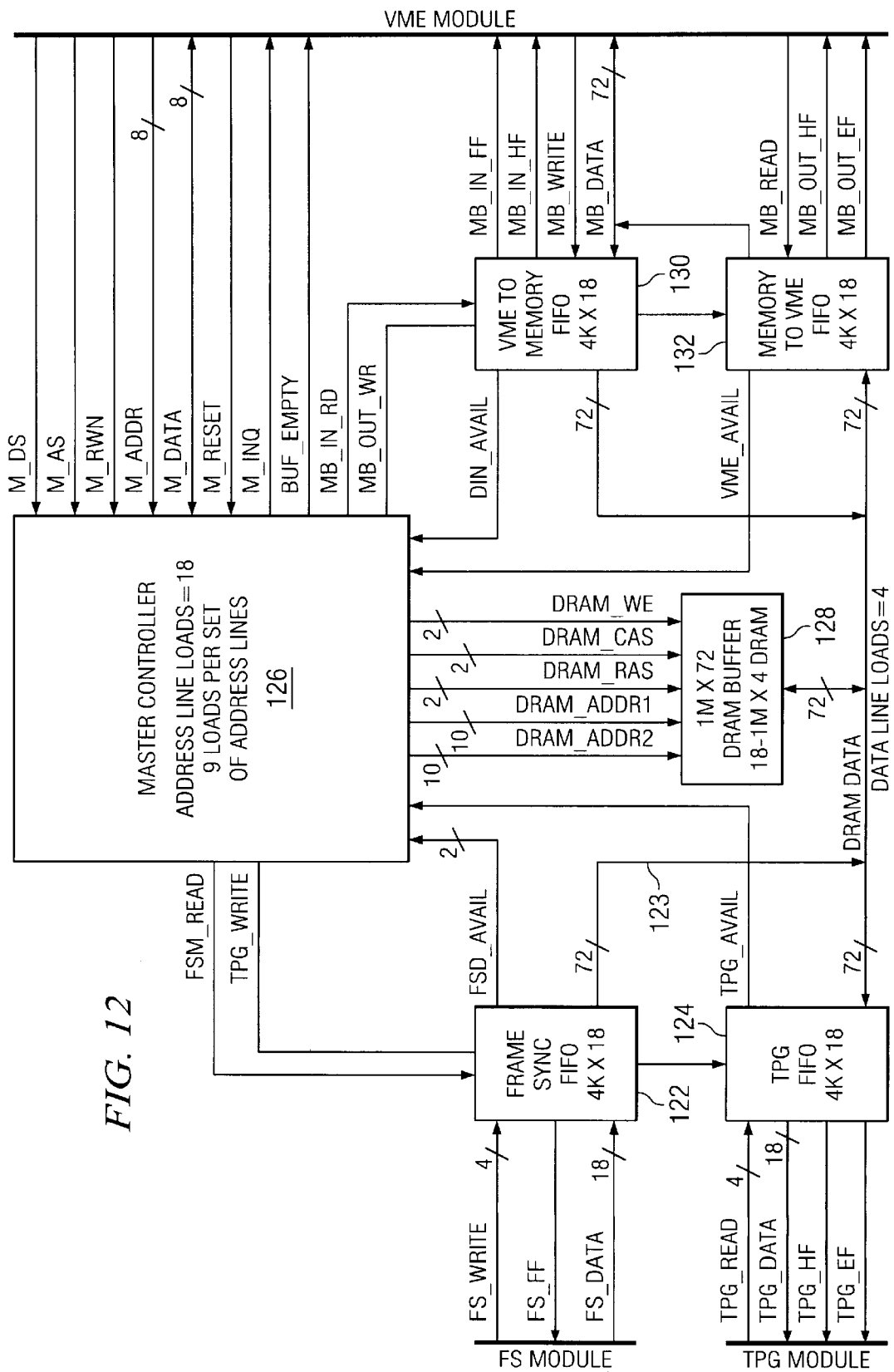
FIG. 12 is a block diagram of the memory buffer module of FIG. 2.
Figure 13:
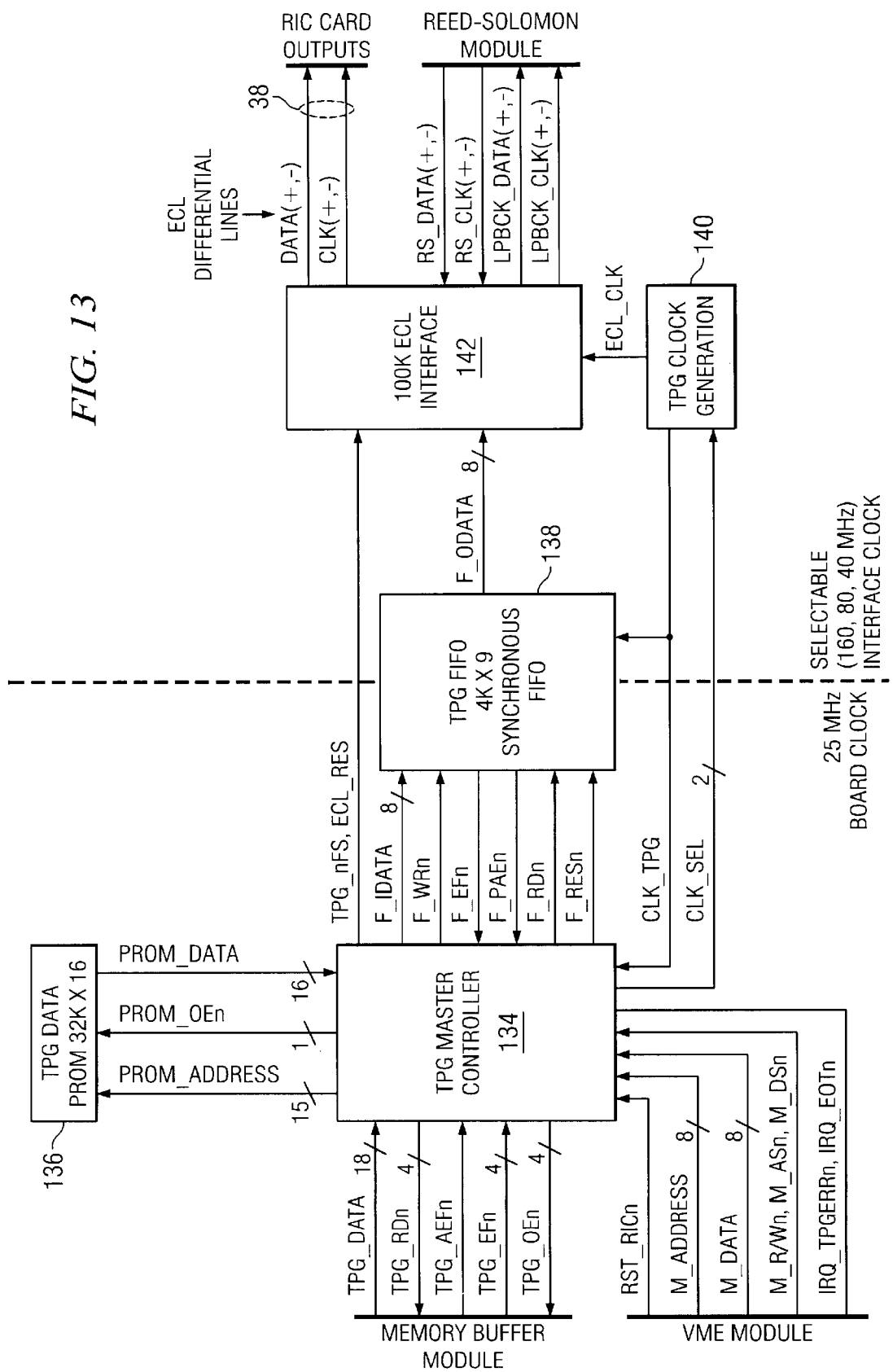
FIG. 13 is a block diagram of the test pattern generator module of FIG. 2.

Referring to FIG. 12, there is shown an expanded block diagram of the memory buffer module 32 of FIG. 2. Frame synchronization data from the wideband frame synchronization module 30 is received at a frame synchronization FIFO module 122. One output of the frame synchronization FIFO module 122 is applied to a test pattern generator FIFO module 124 that also receives signals from the test pattern generator module 36 of FIG. 2. Control signals to the frame synchronization module 122 are received from a master controller 126 having one input from the frame synchronization module 122. The frame synchronization module 122 transfers data on line 123 to a DRAM buffer 128 that is the primary element for transfer of data in the memory buffer module 32. The DRAM buffer 128 also receives address signals and control inputs from the master controller 126. Also coupled to. the DRAM buffer 128 is a MEMORY-TO-VME FIFO module 132 and a VME-TO-MEMORY FIFO module 130. Output data from the MEMORY-TO-VME FIFO module 132 is transferred to the VME bus interface module 34 of FIG. 2. The master controller 126 also receives inputs from the VME bus interface module 34. Referring to FIG. 13, there is shown an expanded block diagram of the test pattern generator module 36 of FIG. 2. A TPG master controller 134 interconnects to the memory buffer module 32 and also to the VME bus interface module 34. The TPG master controller 134 also connects to a TPG data programmable read only memory (PROM) 136 for programming instructions. The TPG master controller 134 receives clock commands from a TPG clock generator 140. Also connected to the master controller 134 is a TPG FIFO synchronous module 132 that outputs data to an ECL interface 142. Both the TPG FIFO module 138 and the ECL interface 142 are clocked from the TPG clock generator 140. The output of the test pattern generation module 36 is generated on lines 38. Also connected to the ECL interface 142 is the Reed-Solomon frame synchronization, forward error correction, and derandomizer module 24.

Figure 14:
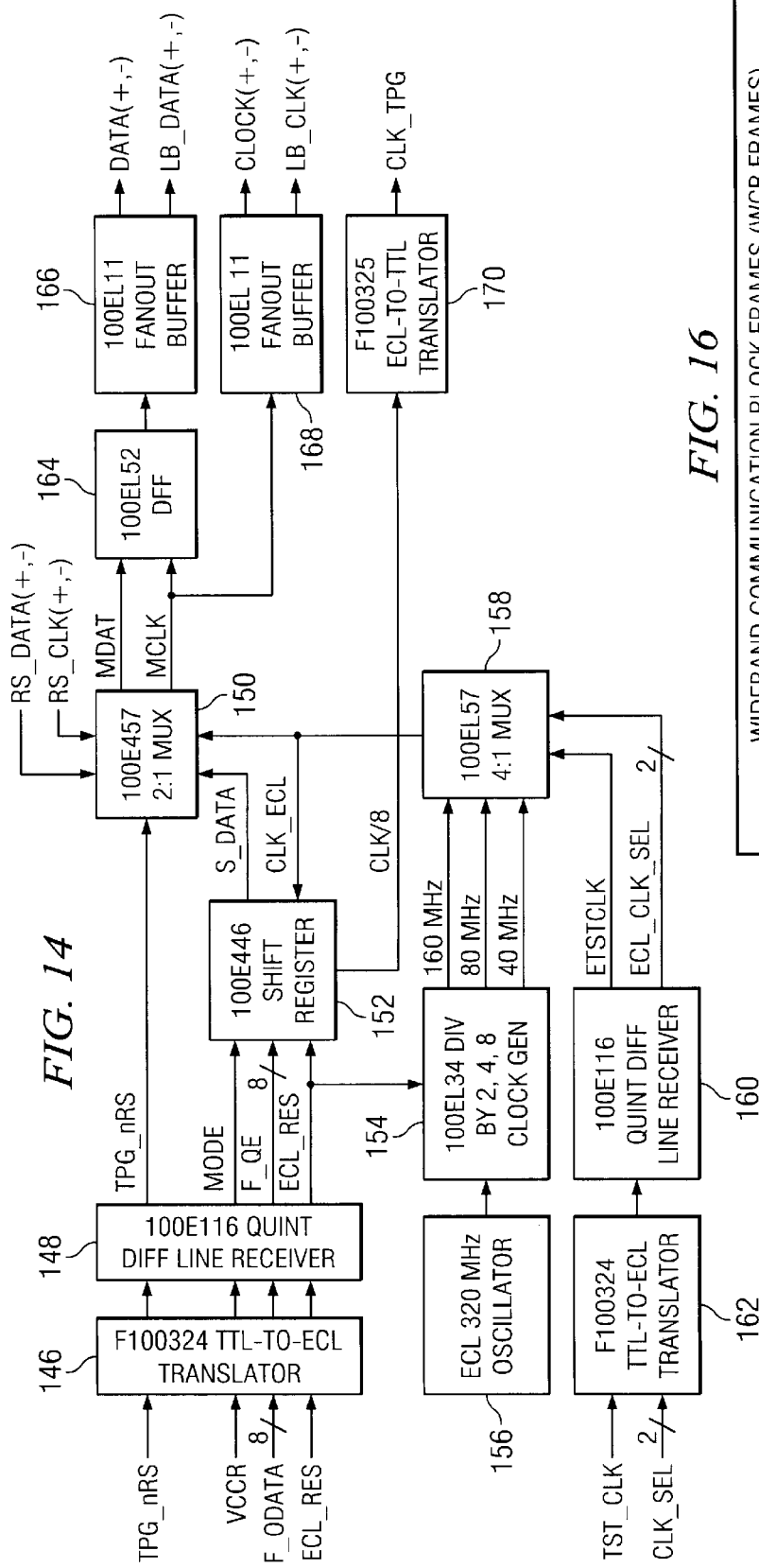
FIG. 14 is a block diagram of the ECL interface of the test pattern generator module ECL interface.

Referring to FIG. 14, there is illustrated an expanded block diagram of the ECL interface 142. Input data to the ECL interface 142 is applied to a TTL-TO-ECL translator 146 that outputs signals to a differential line receiver 148. Outputs from the differential line receiver 148 are applied to a multiplexer 150 and a shift register 152. A signal from the differential line receiver 148 is also applied to a divide by 2, 4, 8 clock generator 154 that is driven by an ECL oscillator 156. Clock signals from the clock generator 154 are applied to a multiplexer 158 that also receives inputs from a differential line receiver 160. The differential line receiver 160 is connected to the output of a TTL-TO-ECL translator 162. An output from the multiplexer 158 is applied to the multiplexer 150 and the shift register 152.

Outputs of the multiplexer 150 are applied to a DFF module 164 and also applied to a fan out buffer 168. The output of the DFF module 164 is applied to a fan out buffer 166. Outputs of the fan out buffer 166, the fan out buffer 168 and an ECL-TO-TTL translator 170 are the output signals of the test pattern generation module 36 interconnected as previously described.

Figure 15:
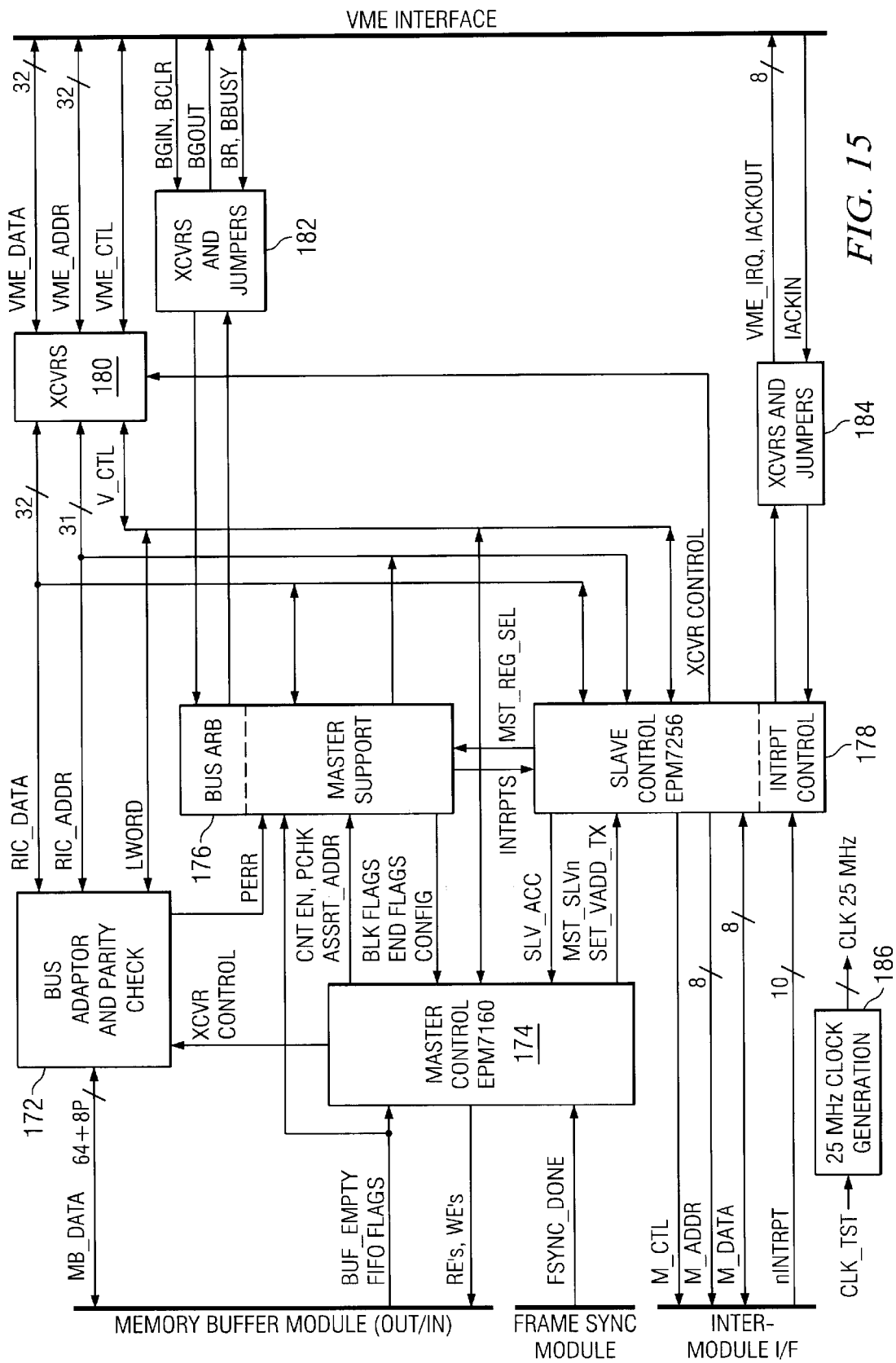
FIG. 15 is a block diagram of the VME interface module of FIG. 2.

Referring to FIG. 15, there is shown an expanded block diagram of the VME bus interface module 34 of FIG. 2. Data to the VME bus interface module from the memory buffer module 32 is applied to a bus adaptor and parity check module 172 that is controlled by commands for a master controller 174. The master controller 174 also supplies commands to the memory buffer module 32 and receives inputs from the frame synchronization module 30. Both the master controller 174 and the parity check module 172 interconnect to a master support module 176 that transmits signals to and receives signals from a slave controller 178. The slave controller 178 also receives data from and transmits data to the parity check module 172 and an XCVRS module 180. Signals from the module 180 are the outputs from the VME bus interface module 34. Also providing signals that are the outputs of the interface module 34 are an XCVRS & jumpers 182 and an XCVRS & jumpers 184. The jumpers 182 interconnect with the bus arbiter of the master support 176. The jumpers 184 interconnect to an interrupt controller of the slave controller 178.

Figure 16:
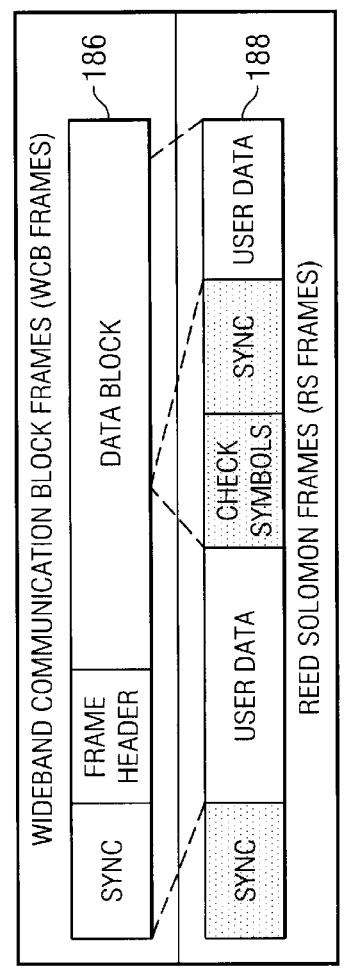
FIG. 16 is an illustration of wideband data format of the bit stream processed by the receiver interface circuit of the present invention.

Referring to FIG. 16, there is shown the format of the wideband communications block frames 186 and the Reed-Solomon frame 188 illustrating the frame configuration analyzed by the receiver interface circuit of the present invention.

What is claimed is:

1. A signal receiver interface circuit, comprising:
   a frame synchronization module receiving an input data bit stream pattern and analyzing the bit stream for derandomization, frame synchronization patterns and forward error correction to identify frame synchronization lock, following the identification of frame synchronization lock, the frame synchronization module outputs the input data bit stream;

a wideband frame synchronization module receiving the input data bit stream output from the frame synchronization module for synchronization on byte aligned synchronization patterns at the beginning of each wideband communications block frame, following the identification of bit stream synchronization, the wideband frame synchronization module outputs the input data bit stream;

a memory buffer module receiving the input data bit stream output from said wideband frame synchronization module where synchronization has been established for intermediate storing of the data bit stream for further processing; and a bus interface coupled to the memory buffer module for transferring the stored data bit stream for processing and analysis.

2. A signal receiver interface circuit as set forth in claim 1 further comprising:

a test pattern generator for generating a test pattern output of a data bit stream for input to said frame synchronization module.

3. A signal receiver interface circuit as set forth in claim 1 wherein said frame synchronization module comprises a Reed-Solomon frame synchronizer.

4. A signal receiver interface circuit as set forth in claim 1 wherein said frame synchronization module comprises a Reed-Solomon controller, and a Reed-Solomon synchronization detection, validation and alignment module interconnected to said Reed-Solomon controller.

5. A signal receiver interface circuit as set forth in claim 1 further comprising a data acquisition module receiving the input data stream for transferring to said frame synchronization module.

6. A signal receiver interface circuit, comprising:

a data acquisition module receiving an input data bit stream pattern and providing at an output consecutive data frames;

a synchronization module receiving the output of the data acquisition module in addition to reset and enable signals and outputting a data bit stream of consecutive frames;

a synchronization detection, validation and alignment module receiving the output of the synchronization module and generating a plurality of channels of data;

a controller receiving the plurality of channels of data, the controller outputs a plurality of consecutive frames of the input data bit stream;

a wideband synchronization module receiving the input data bit stream output from the controller for synchronization on byte aligned synchronization patterns at the beginning of each wideband communications block frame, following the identification of the bit stream synchronization, the wideband frame synchronization module outputs the input data bit stream;

a memory buffer module receiving the input data bit stream output from the wideband frame synchronization module where synchronization has been established for intermediate storing of a data bit stream for further processing; and a bus interface coupled to the memory buffer module for transferring the stored data bit stream for processing and analysis.

7. The signal receiver interface circuit as in claim 6 further comprising a window controller providing the reset and enable signals to the synchronization module and data control and select signals to the data acquisition module.

8. A signal receiver interface circuit as set forth in claim 6 further comprising:

a test pattern generator for generating a test pattern output of a data bit stream for input to said frame synchronization module.

9. A signal receiver interface circuit as set forth in claim 6 wherein the synchronization detection, validation and alignment module comprises a Reed-Solomon frame synchronizer.

10. A method for identifying synchronization lock for consecutive data frames in a data bit stream, comprising:

receiving frames of data in an input bit stream;

detecting a predetermined number of consecutive data frames having a valid format in the input bit stream; and in response to detecting a predetermined number of consecutive valid format data frames, monitoring for synchronization patterns within a synchronization window, wherein when the predetermined number of consecutive data frames with corresponding valid formats is detected, advancement into a lock mode may occur to monitor one or more of the synchronization patterns within the synchronization window.

11. The method of claim 10 wherein detecting a predetermined number of consecutive data frames having a valid format comprises:

evaluating a frame for an established frame length; and determining if a synchronization signal has less than a preset number of bit errors.

12. The method of claim 10 further comprising:

determining an out of synchronization condition when a predetermined number of consecutive data frames without valid formats are detected.

13. The method of claim 10 further comprising repeating the sequence of detecting a predetermined number of consecutive data frames having a valid format and monitoring for synchronization patterns within the synchronization window.

\* \* \* \* \*

UNITED STATES PATENT AND TRADEMARK OFFICE
CERTIFICATE OF CORRECTION

PATENT NO. : 6,643,788 B1
DATED : November 4, 2003
INVENTOR(S) : John Mitchell Butler et al.

It is certified that error appears in the above-identified patent and that said Letters Patent is hereby corrected as shown below:

Title page,
*Assistant Examiner*, change "Suryawanski" to -- Suryawanshi --.

Column 2,
Line 23, change "of it stream" to -- of the bit stream --.
Lines 30-31, change "interconnection" to -- interconnections --.

Column 5,
Line 57, between "coupled to" and "the DRAM", delete the period.

Signed and Sealed this

Seventh Day of September, 2004

JON W. DUDAS
*Director of the United States Patent and Trademark Office*